United States Patent
Foss et al.

(10) Patent No.: US 9,309,863 B2
(45) Date of Patent: Apr. 12, 2016

(54) MAXIMALLY EFFICIENT VERTICAL AXIS WIND TURBINE

(71) Applicant: BOARD OF TRUSTEES OF MICHIGAN STATE UNIVERSITY, East Lansing, MI (US)

(72) Inventors: John F. Foss, East Lansing, MI (US); Richard Wlezien, Ames, IA (US); Bingsen Wang, Okemos, MI (US)

(73) Assignees: Board of Trustees of Michigan State University, East Lansing, MI (US); Iowa State University Research Foundation, Inc., Ames, IA (US)

( * ) Notice: Subject to any disclaimer, the term of this patent is extended or adjusted under 35 U.S.C. 154(b) by 437 days.

(21) Appl. No.: 13/960,400

(22) Filed: Aug. 6, 2013

(65) Prior Publication Data
US 2014/0044542 A1    Feb. 13, 2014

Related U.S. Application Data

(60) Provisional application No. 61/680,596, filed on Aug. 7, 2012.

(51) Int. Cl.
| | |
|---|---|
| *F03D 3/00* | (2006.01) |
| *F41F 1/06* | (2006.01) |
| *F42B 12/36* | (2006.01) |
| *A61G 17/08* | (2006.01) |

(52) U.S. Cl.
CPC ............... *F03D 3/005* (2013.01); *A61G 17/08* (2013.01); *F41F 1/06* (2013.01); *F42B 12/36* (2013.01)

(58) Field of Classification Search
CPC ........................................ F03D 3/005
See application file for complete search history.

(56) References Cited

U.S. PATENT DOCUMENTS

| | | | | |
|---|---|---|---|---|
| 1,408,988 | A * | 3/1922 | Chenoweth | F03D 3/068 416/111 |
| 1,568,000 | A * | 12/1925 | Schmidt | F03D 3/068 416/111 |
| 5,499,904 | A | 3/1996 | Wallace et al. | |
| 5,503,525 | A | 4/1996 | Brown et al. | |
| 5,855,470 | A * | 1/1999 | Holmes | F03D 3/068 415/124.1 |
| 6,740,989 | B2 | 5/2004 | Rowe | |
| 6,857,846 | B2 * | 2/2005 | Miller | F03D 3/02 415/18 |
| 7,329,965 | B2 | 2/2008 | Roberts et al. | |
| 7,344,353 | B2 | 3/2008 | Naskali et al. | |
| 7,726,934 | B2 | 6/2010 | Cowan | |
| 7,780,411 | B2 | 8/2010 | Yan | |
| 8,016,544 | B1 * | 9/2011 | Nguyen | F03D 3/067 415/130 |
| 8,118,538 | B2 | 2/2012 | Pao | |
| 8,193,657 | B2 | 6/2012 | Paluszek et al. | |
| 8,226,348 | B2 | 7/2012 | Scerbina | |
| 8,362,641 | B2 | 1/2013 | Gandy | |

(Continued)

*Primary Examiner* — Audrey K Bradley
(74) *Attorney, Agent, or Firm* — David D. Murray; Vivacqua Law, PLLC

(57) ABSTRACT

A maximally efficient vertical axis wind turbine (MEVAWT) includes a rotatable circular frame having upper and lower concentric flat rings or disks which support a plurality of, typically three, four, five or six, pivotable cascades, each including a plurality of fixed, configurable airfoils. The airfoils preferably include a single, pivotable trailing flap and may include lateral extensions. The center and periphery of the lower ring are supported in suitable bearings to facilitate free rotation of the frame. Wind direction and velocity sensors provide data utilized to control drive mechanisms which orient each cascade and the flap of each airfoil to maximize the resultant power produced by the turbine.

20 Claims, 8 Drawing Sheets

(56) References Cited

U.S. PATENT DOCUMENTS

| | | | |
|---|---|---|---|
| 2008/0256795 A1 | 10/2008 | Edwards | |
| 2009/0060744 A1* | 3/2009 | Krauss | F03D 3/005 416/197 A |
| 2009/0180878 A1* | 7/2009 | Alunni | F03D 3/005 416/132 B |
| 2009/0202346 A1* | 8/2009 | Baron | F03D 3/068 416/9 |
| 2010/0084863 A1 | 4/2010 | Potter | |
| 2010/0124506 A1 | 5/2010 | Richartz et al. | |
| 2011/0123332 A1* | 5/2011 | Grenier | F03D 3/061 416/41 |

* cited by examiner

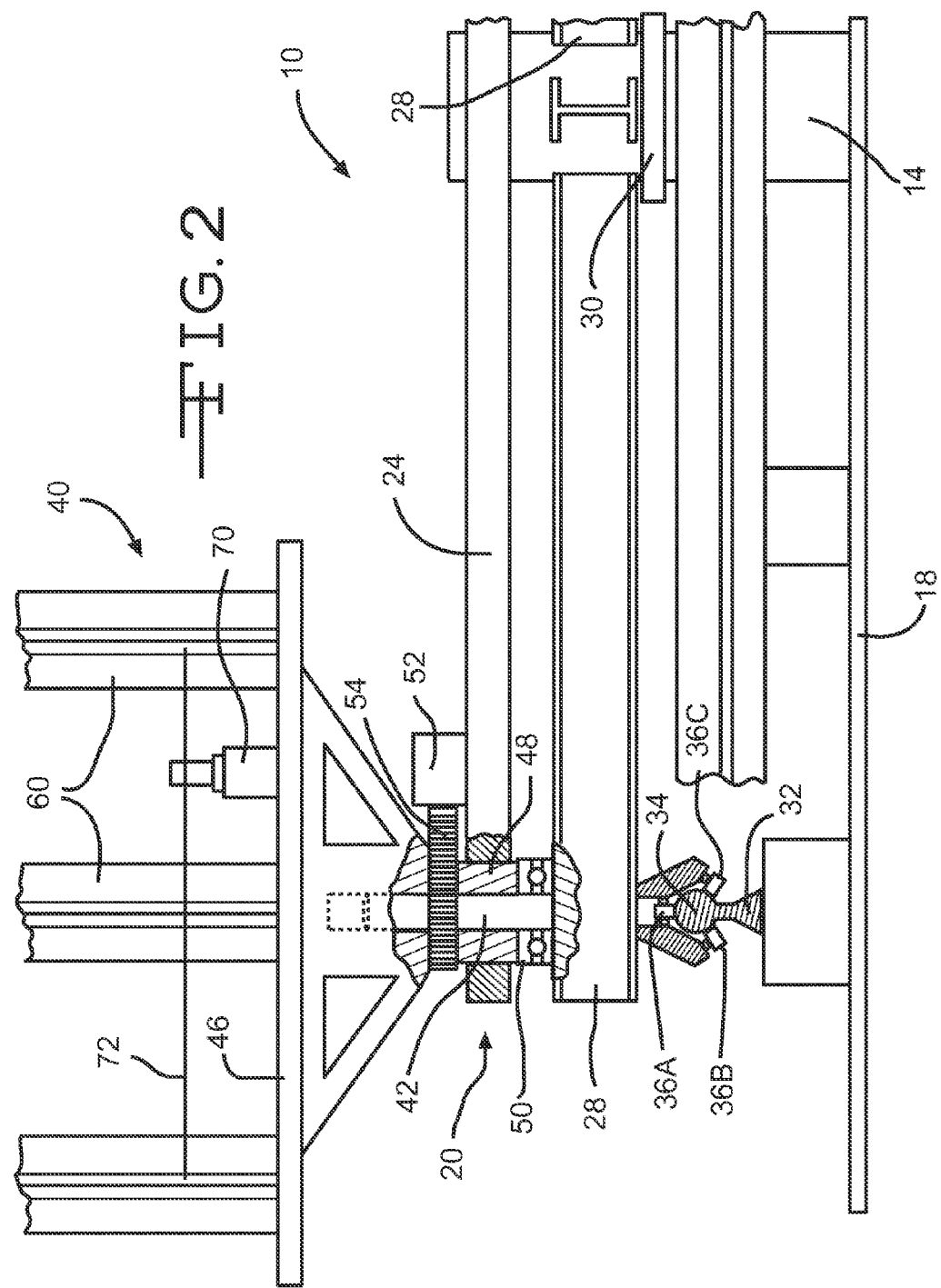

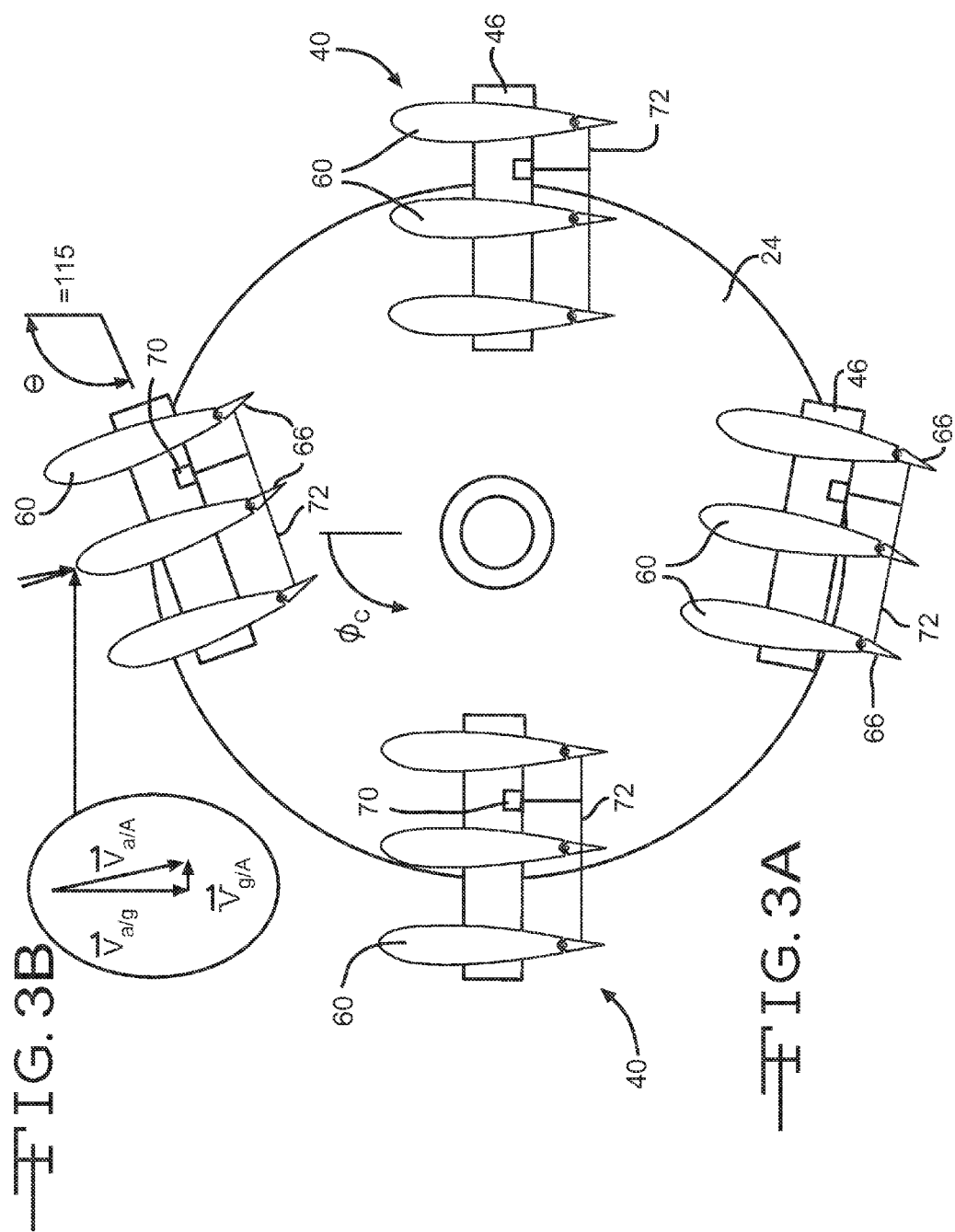

| Zone | I | II | III | IV |
|---|---|---|---|---|
| Θ Range | $\approx \frac{\pi}{4} - \frac{3\pi}{4}$ | $\approx \frac{3\pi}{4} - \frac{5\pi}{4}$ | $\approx \frac{5\pi}{4} - \frac{7\pi}{4}$ | $\approx \frac{7\pi}{4} - \frac{\pi}{4}$ |
| Airfoil Status | (Width Extended) (74) | Flaps (66) Clockwise | (Width Normal) | Flaps (66) Counterclockwise |
| Aerodynamic Force and Torque | Drag $\vec{|T|} > 0$ | Lift $\vec{|T|} > 0$ | Drag $\vec{|T|} < 0$ | Lift $\vec{|T|} > 0$ |

MAXIMALLY EFFICIENT VERTICAL AXIS WIND TURBINE

CROSS REFERENCE TO RELATED APPLICATION

This patent application claims the benefit of U.S. Provisional Patent Application Ser. No. 61/680,596, filed Aug. 7, 2012, which is hereby incorporated in its entirety herein by reference.

FIELD

The present disclosure relates to wind turbines for electric power generation and more particularly to a vertical axis wind turbine having improved efficiency.

BACKGROUND

The statements in this section merely provide background information related to the present disclosure and may or may not constitute prior art.

Modern wind turbines generally exist in two configurations: horizontal axis and vertical axis, the designations referring to the axis about which the turbine blade disk rotates. Horizontal axis wind turbine (HAWT) configurations are inherently more efficient than vertical axis wind turbines (VAWT) because the full blade disk faces the ambient wind, whereas the blades in a vertical axis turbine alternately advance into and retreat from the wind. Nonetheless, both configurations have certain recognized benefits and drawbacks. Commercial HAWTs are generally immense devices, mounted high in the air where they are exposed to higher wind velocities but where they contribute to visual pollution and interference with migratory and local bird flight and produce strobe-like effects during periods of low incident sunlight, i.e., dawn and dusk. On the other hand, VAWTs are generally installed closer to the ground. While this siting yields lower effective wind speeds, it effectively overcomes the visual pollution, bird and strobe effect problems of HAWTs. Being nearer the ground also allows VAWT's to be more readily repaired and maintained. Moreover, VAWTs can be placed in close proximity to each other, an attribute that is beneficial, especially for wind farm installations.

In both wind turbine types the ultimate objective is the maximization of the resultant power (the product of the shaft torque and the angular rate) delivered to an electrical generator for every ambient wind direction and velocity condition. As the foregoing summary highlights, it would be advantageous to develop wind turbines that have the inherent advantages of VAWTs that are also more efficient and thus competitive with HAWTs. The present invention is so directed.

SUMMARY

The present invention provides a vertical axis wind turbine that provides greatly improved efficiency over prior art vertical axis turbine configurations because of the mechanical elements that lead to the maximum torque being applied to the electrical generator from the aerodynamic blades. A maximally efficient vertical axis wind turbine (MEVAWT) according to the present invention includes a rotatable circular frame having upper and lower concentric flat rings or disks which support a plurality of, typically three, four, five or six, pivotable cascades, each including a plurality of fixed, configurable airfoils. The airfoils preferably include single, pivotable trailing flaps and may include lateral extensions. The center and periphery of the lower ring are supported in suitable bearings to facilitate free rotation of the frame. Wind direction and velocity sensors provide data utilized to control drive mechanisms which orient each cascade and the flap of each airfoil to maximize the resultant power produced by the turbine. An integral electrical generator includes permanent magnets on the periphery of the lower ring of the frame which cooperate with adjacent stator windings.

Thus it is an aspect of the present invention to provide a vertical axis wind turbine having improved efficiency, It is a further aspect of the present invention to provide a vertical axis wind turbine having a rotatable frame including a bearing supported lower ring.

It is a still further aspect of the present invention to provide a vertical axis wind turbine having a wind direction sensor and a wind velocity sensor.

It is a still further aspect of the present invention to provide a vertical axis wind turbine having a plurality of cascades each having a plurality of airfoils.

It is a still further aspect of the present invention to provide a vertical axis wind turbine having a plurality of pivotable cascades each having a plurality of airfoils.

It is a still further aspect of the present invention to provide a vertical axis wind turbine having a plurality of pivotable cascades each having a plurality of fixed, configurable airfoils.

It is a still further aspect of the present invention to provide a vertical axis wind turbine having a plurality of pivotable cascades having a plurality of airfoils and drive assemblies for pivoting the cascades and configuring the airfoils.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is an enlarged, fragmentary view of the lower frame and bearings of a vertical axis wind turbine according to the present invention;

FIG. 3A is a sectional view of a vertical axis wind turbine according to the present invention;

FIG. 3B is a vector velocity triangle for a cascade at $\phi_c=0$ wherein a=air, g=ground and A=airfoil;

FIG. 5 is a chart presenting various operational parameters of a vertical axis wind turbine according to the present invention keyed to the rotational position of the turbine frame;

DETAILED DESCRIPTION

The following description is merely exemplary in nature and is not intended to limit the present disclosure, application, or uses.

Vertical Axis Wind Turbine Structure

Figure 1:
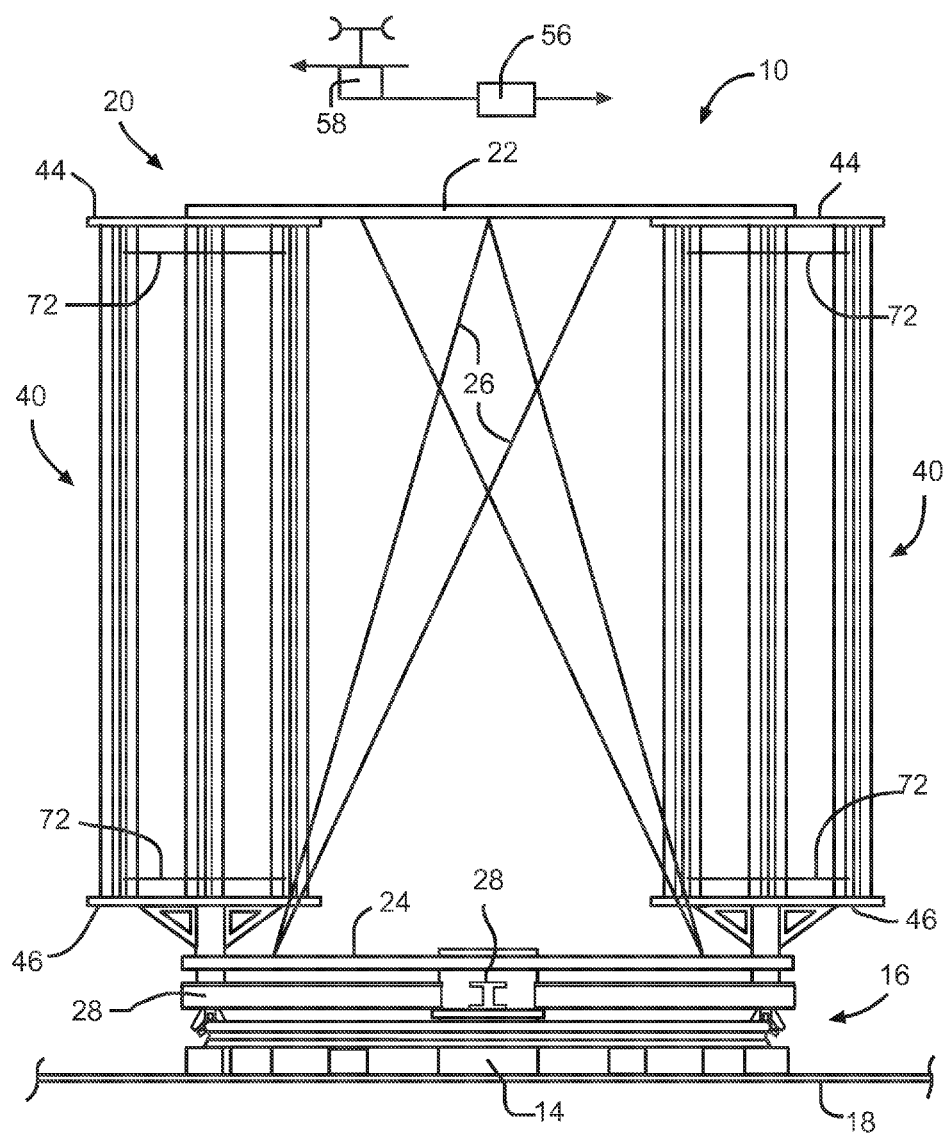
FIG. 1 is a side elevational view of a vertical axis wind turbine according to the present invention.

With reference to FIGS. 1 and 2, a vertical axis wind turbine according to the present invention is illustrated and generally designated by the reference number 10. The vertical axis wind turbine 10 includes a vertical, stationary central support or shaft 14 and a concentric, circular base 16. The central support 14 and the circular base 16 may be attached to and supported by a fixed structure such as a tower, column, post, building or other structure 18 which locates, stabilizes and elevates the vertical axis wind turbine 10 above surrounding objects, obstacles and terrain. A circular frame 20 includes an upper circular plate or disk 22 and a co-axial, vertically and axially spaced apart lower circular plate or disk 24. The upper circular disk 22 and the lower circular disk 24 are connected by a plurality of cross-bracing oblique cables 26 that maintain the disks 22 and 24 co-axially and in compression. Alternatively, the central support or shaft 14 may be extended to support the upper circular disk 22 although this is undesirable because its presence, in the middle of the vertical axis wind turbine 10, will interfere with through air flow and reduce the efficiency and power output thereof.

Below the lower circular plate or disk 24 or integrally assembled therewith are a plurality of equally circumferentially spaced radial support arms 28. The circular frame 20, including the upper and lower circular disks 22 and 24 and the radial arms 28 are freely, rotatably supported on the central support 14 by a center anti-friction bearing 30 disposed between the central support 14 and the radial arms 28. For a commercially viable VAWT, the circular frame 20 will typically be quite large and have a diameter between ten and twenty meters or more or less. The circular base 16 locates and supports a concentric circular track 32 having an upper terminal portion 34 defining a generally circular cross section. In contact with, stabilized by and riding on the circular track 32 are a plurality of main support bearings 36A, a plurality of outside, anti-tipping bearings 36B and a plurality of inside, guide bearings 36C which are connected to and support the radial arms 28 and the frame 20.

Referring now to FIGS. 1, 2 and 3A, extending vertically between the upper circular disk 22 and the lower circular disk 24 are a plurality of cascades 40. As utilized herein, the term "cascade" or "cascades" refers to an assembly(ies) or component(s) of a vertical axis wind turbine that includes an upper and a lower base, plate or end member and a plurality of generally parallel, vertical, configurable airfoils extending between and secured to the bases, the bodies of the airfoils being fixed relative to the bases and one another. The plurality of cascades 40 may include typically three, four, five or six, or more or fewer cascades 40 depending upon various operational parameters. Each of the cascades 40 is rotatably mounted upon a vertical support or shaft 42 which is, in turn, supported by one of the radial arms 28. It should thus be appreciated that, preferably, there will be an equal number of radial arms 28 and cascades 40.

Each of the cascades 40 includes an upper plate, base or end member 44, a lower plate, base or end member 46, a hollow support tube 48 that receives the vertical support or shaft 42 and a plurality of configurable airfoils 60 that are fixedly secured to the upper and lower bases or end members 44 and 46. A suitable antifriction thrust bearing 50 preferably resides between each of the vertical supports or shafts 42 and the hollow support tube 48 to facilitate free, pivoting motion of the cascade 40 about the axis of the vertical support or shaft 42. A drive mechanism 52 that is capable of constantly and independently rotating and re-orienting each of the cascades 40 relative to the circular frame 20 is associated with each of the cascades 40. The drive mechanisms 52 may be electrically, pneumatically or hydraulically operated, are disposed on the lower circular disk 24 and drive, i.e. rotate, each cascade 40 through, for example, a gear train, chain or timing belt 54. The drive mechanisms 52 receive signals from a microprocessor 56 having data inputs and outputs, storage, algorithms incorporating the equations set forth more completely below and other conventional electronic modules. The microprocessor 56, in turn, receives data from a wind speed and direction sensor 58 that is located near the vertical axis wind turbine 10 so that its measurements accurately reflect the wind direction and speed to which the turbine 10 is exposed but not so near as to be affected by the presence of the turbine 10.

The number of airfoils 60 on each of the cascades 40 is equal and will be three, four, five, six or more or fewer depending upon various operational parameters. The illustration of three airfoils 60 on each of the cascades 40 in FIGS. 1, 2 and 3A is thus exemplary and illustrative. Similarly, the height of the airfoils 60 will vary depending upon the operational parameters, primarily the desired power output but will be in the range of from three to five meters or more or less.

Figure 4A:
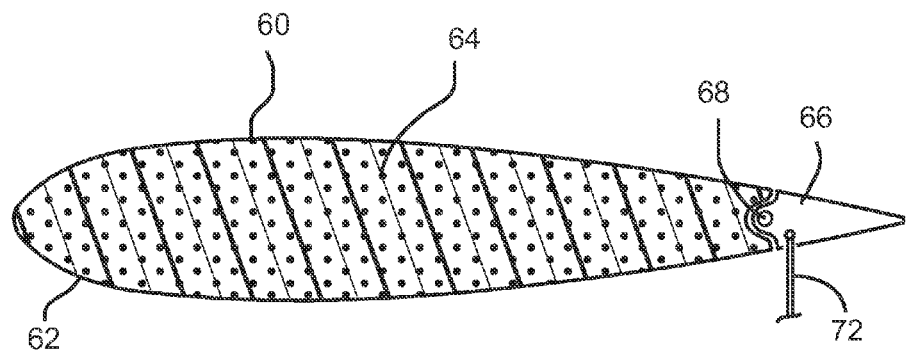
FIG. 4A is an enlarged, top plan view of a preferred airfoil according to the present invention.
Figure 4B:
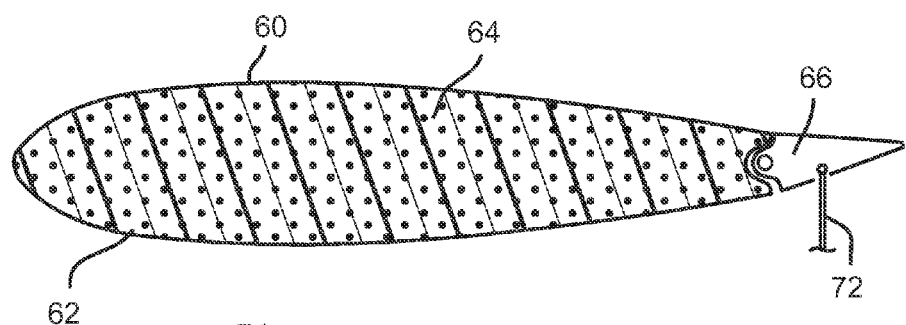
FIG. 4B is an enlarged, top plan view of a preferred airfoil according to the present invention with its single flap or tail pivoted to the right.

Referring now to FIGS. 3A, 4A and 4B, each of the airfoils 60 of each of the cascades 40 is identical and has an aerodynamic body with a profile defined by NACA 0018 or a similar symmetrical airfoil shape. As FIG. 3 illustrates, not only do the airfoils 60 of each of the cascades 40 pivot in unison as the frame 20 rotates, but also the configuration of each of the airfoils 60 changes as the frame 20 rotates. FIG. 4A illustrates a preferred airfoil 60 and single tail in a straight or centered state. The bodies 62 of the airfoils 60 include a thin metal, preferably aluminum, skin which defines a rigid, plastic foam filled interior 64. Each of the airfoils 60, which are appropriately referred to as single flap airfoils, includes a single, symmetrical movable flap or tail 66 which is disposed on a vertical pivot 68 and moved about the vertical pivot 68 by one or more bi-directional, proportional actuators or operators 70. Typically, a pair of actuators 70 will be disposed on the respective upper and lower bases or end members 44 and 46 and pivot in unison all the flaps or tails 66 of the airfoils 60 on a given cascade 40 through upper and lower linkages 72. Depending upon the height of the airfoils 60, additional actuators or operators 70 and linkages 72, also acting in parallel, may be utilized with the flaps or tails 66.

In FIG. 4B, the single flap or tail 66 is deployed counterclockwise approximately 4°. It will be appreciated that, first of all, the single flap or tail 66 may also be moved clockwise and, second of all, that the range of motion is quite small, on the order of 2° to 8° either side of center.

Figure 4C:
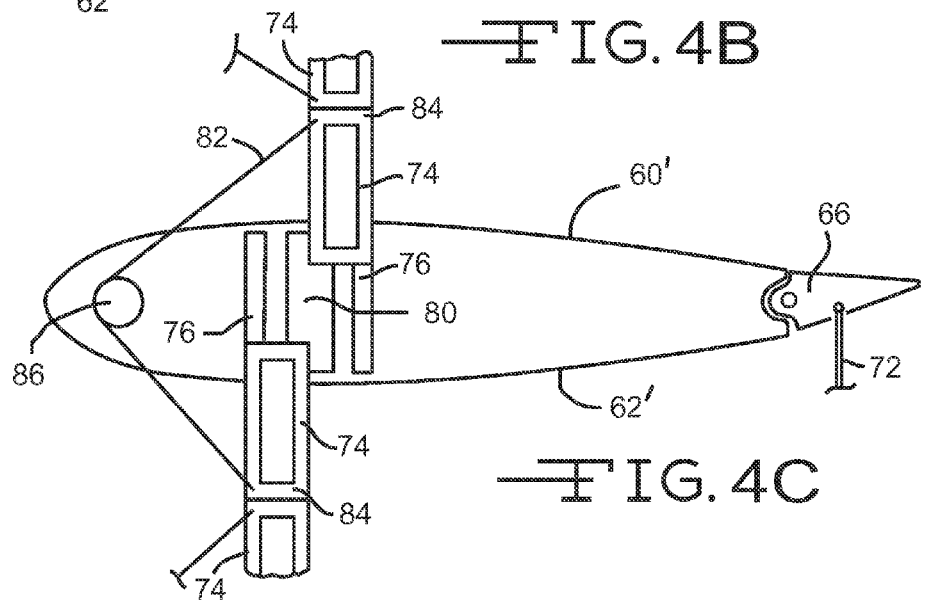
FIG. 4C is an enlarged, top plan view of adjacent airfoils according to the present invention with their lateral (width) extensions extended.

Referring now to FIG. 4C, an alternate embodiment airfoil 60' includes a pair of laterally extendable width extenders 74 that, when fully retracted, do not interfere with air flow over the aerodynamic body 62' and have sufficient size that, when fully extended, as illustrated in FIG. 4C, effectively close off the space between the bodies 62' of adjacent airfoils 60. Each of the width extenders 74 includes an operator or actuator which may be a gear rack 76 which is translated laterally by a motor or operator 80 which may be electrically, hydraulically or pneumatically powered. A stabilizing cable 82 is connected to an outer end 84 of each of the width extenders 74 and is supplied by, maintained in tension and recovered by a spring driven drum 86. Alternatively, a linear actuator such as a double acting pneumatic or hydraulic cylinder (not illustrated) may be utilized to extend and retract the width extenders 74 and multiple gear racks 76, operators 80 and stabilizing cables 82 and drums 86 may be utilized depending upon the height of the airfoils 60.

Figure 7:
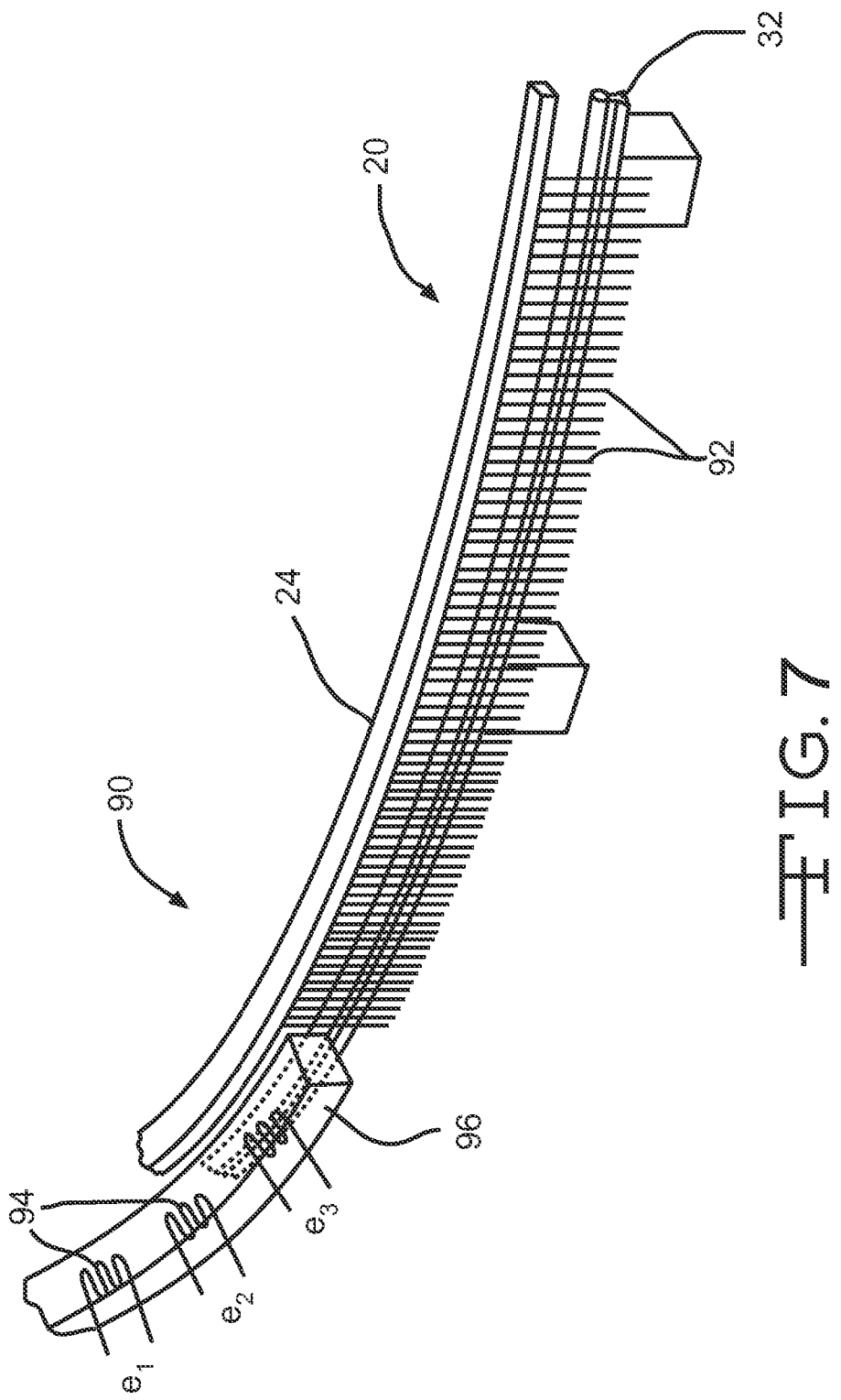
FIG. 7 is a diagrammatic view of an electrical generator combined with a vertical axis wind turbine according to the present invention.

Referring now to FIG. 7, the structure of the vertical axis wind turbine 10 according to the present invention is well suited to integration of an electrical generator 90. Since the rotating frame 20 may readily have a diameter of twenty meters, and thus a circumference of over sixty-two meters, the surface speed, even at a relatively slow rotational speed will be significant. A plurality of permanent magnets 92 having alternating adjacent poles are secured to the periphery of the frame 20. Closely adjacent the permanent magnets 92 are a plurality of stator coils 94 which surround the frame 20 and are disposed in a circular support 96.

Operation and Theory of the Vertical Axis Wind Turbine

Referring now to FIG. 5, the power producing torque ($\vec{T}$), of the vertical axis wind turbine 10 derives from the aerodynamic lift and drag forces $(\vec{F}_L + \vec{F}_D)$[1] on each airfoil 60 of each of the cascades 40. The key elements that establish the maximum efficiency are: i) the use of four zones of the airfoils' properties during one cycle of operation (that is, for one complete revolution of the assembly of cascades 40), and ii) the addition of the moveable flap or tail 66 and, optionally, the width extenders 74 to the basic airfoils 60 of the cascades 40.

[1] The lift force $\vec{F}_L$ is perpendicular to the velocity vector of the approach flow. The drag force: $\vec{F}_D$ is parallel to that approach flow. The two forces are characterized by coefficients as: $F_L = C_L \rho(V^2/2) A_{plan\ form}$; $F_D = C_D \rho(V^2/2) A_{plan\ form}$.

The airfoil configurations are shown in FIGS. 4A, 4B and 4C. The four zones are designated using nominal $\phi_c$ values (see FIG. 5) where $\phi_c = 0$ is designated as the alignment of the radial support arms 28 with the approach wind and $d\phi_c > 0$ involves a counterclockwise motion (in keeping with the right-hand rule and the angular motion of the turbine 10). The four zones are:

Zone I: $\pi/4 \lesssim \phi_c \lesssim 3\pi/4$, bluff body, maximum torque, deployment of the optional width extenders 74 or the flaps or tails 66 to increase the aerodynamic drag;

Zone II: $3\pi/4 \lesssim \phi_c \lesssim 5\pi/4$, the single flaps or tails 66 pivoted clockwise for maximum lift;

Zone III: $5\pi/4 \lesssim \phi_c \lesssim 7\pi/4$, the single flaps or tails 66 straight and the optional width extenders 74 withdrawn for minimum drag; and Zone IV: $7\pi/4 \lesssim \phi_c \lesssim \pi/4$, the single flaps or tails 66 pivoted counterclockwise for maximum lift.

Note that the downwind: $\phi_c = \pi/2 \rightarrow 3\pi/2$, region will be influenced by the upwind cascades 40. The zone boundaries must be corrected for these effects.

An additional degree-of-freedom is provided by the orientation of the cascade: $\theta_c = \theta_c(\phi_c)$, with respect to the radial support arm 28; see FIGS. 6A and 6B. That is, the airfoils 60 are rigidly attached to the upper and lower cascade bases 44 and 46 that are dynamically positioned as $\theta_c = \theta_c(\phi_c)$ to obtain maximum torque in zones IV, I and II in addition to minimizing the torque penalty in zone III as the cascade 40 moves into the approach flow.

A subtle, but important aspect of the maximally efficient claim, involves the power to establish the airfoil conditions as a function of $\phi_c$. Namely, i) The outward motion of the optional width extenders 74 is only resisted by mechanical friction and the aerodynamic forces of shear and pressure. The former is a small magnitude; the latter is on a face that is laterally advancing and, hence, is also small.

ii) The parasitic power to deploy the width extenders 74 will be minimal which will allow their relatively rapid deployment.

iii) The single flaps or tails 66 will encounter resistance as they are moved into position but these power levels are also minimized by the conditions:
  a) Clockwise deployment of the flaps or tails 66 can be gradually executed during the $\phi_c$ transition from $\pi/4$ to $3\pi/4$ when the optional width extenders 74 block the approach flow, and
  b) The flaps or tails 66 can be gradually extended counterclockwise as the cascade 40 approaches and passes through $\phi_c = 7\pi/4$.

Notes: a) A velocity triangle for the cascade at $\phi_c = 0$ is shown in FIG. 3B.
b) The relative chord length=C/D=0.327 is representative of that for the planned prototype. c) The radial support arms 28 (below the indicated disk 24) are not shown in this figure. d) The four cascades 40 and the three airfoils 60 per cascade are merely representative.

The derived power is maximized by causing each airfoil 60 in a cascade 40 to maximize the component of the net aerodynamic force: $\vec{F}_L + \vec{F}_D$ that is perpendicular to the support arm 28 for that cascade 40. The incoming wind direction will be monitored for a suitable period by the sensor 58 (to gain its locally averaged value) and the control system will continuously position the cascade 40 during the $0 \rightarrow 2\pi$ revolution of $\phi_c$ in keeping with that inflow direction and velocity magnitude. Implicit in this description is the condition that $\Omega(=d\phi/dt)$ will be controlled to permit the required position adjustments to be made during the period of the revolution. The angular speed ($\Omega$) will be controlled by the extracted power from the generator 90 as is described below.

Limiting $\Omega$ to account for the positioning requirements has the negative attribute that the extracted power is also limited. In this regard, it is a positive attribute that:
i) the rapid deployment of the optional width extenders 74 will permit the extended period ($\phi_c \approx \pi/4 \rightarrow 3\pi/4$) to pivot the flaps or tails 66 from the counterclockwise position to the clockwise position, and
ii) pivoting the single flaps or tails 66 from the clockwise position to the center as $\phi_c$ approaches $5\pi/4$ can proceed quickly since the air pressure will augment this motion. Pivoting the flaps or tails 66 counterclockwise will define the slowest transition event. Since gaining lift in the $\phi_c \approx 7\pi/4$ region will be a minor contributor to the complete power generation, counterclockwise movement of the flaps or tails 66 can also be executed with limited speed.

These are the factors that will establish the optimal $\Omega$ value. For the present purpose of assigning numerical values, 5 seconds will be allowed for the $\phi_c = 13\pi/8 \rightarrow 15\pi/8$ transition or $\Omega = 1.5$ rpm.

The approach flow for a given airfoil 60 can be described as (see FIG. 3):

$$\vec{V}_{a/A} = \vec{V}_{a/g} + \vec{V}_{g/A}$$

where a=air, g=ground and A=airfoil. $\vec{V}_{g/A}$ will be perpendicular to the radial support arm 28. That is, $\vec{V}_{g/A}$ is opposite to that of the optimal sum of the aerodynamic forces.

Using $\vec{V}_{a/g} = 10$ mph=4.4 m/sec as the start-up speed and $d\phi_c/dt = \Omega = 1.5$ rpm as an angular speed that will allow the $\theta_c$ and $\gamma$ positions to be established for a twenty meter diameter vertical axis wind turbine 10, it is seen that $\vec{V}_{g/A}$ must be accounted for in the $\theta_c(\phi_c, \vec{V}_{a/g})$ control system; see FIG. 3.

Arranging the split-flap airfoils 60 in the cascade 40 does more than simply multiply the aerodynamic forces of one airfoil by N blades, it makes the airfoils exhibit larger lift coefficients than the $C_L(\alpha)$ values of an isolated airfoil since the adjacent airfoils provide an attached flow condition (on the suction side) for a higher angle of attack than that for an isolated airfoil. The cascade of airfoils will also be responsible—to some extent—for a flow blockage effect that will cause the flow to divert around the cascade.

The operational strategy can be described in summary form as:
- the approach wind direction is known as a suitably time-averaged quantity
- $\phi_c=0$ is referenced to that compass direction for all cascade support arms
- $\theta_c$ and the flap deployments are known as a function of $\phi_c$ for the maximum torque: $[\vec{R}_c \times (\vec{F}_L + \vec{F}_D)_{net}]$, condition. Note, the $\theta_c = \theta_c(\phi_c)$ dependence is a first order effect. A second order effect is present to account for $\vec{V}_{g/A}$ at low $|\vec{V}_{a/g}|$ values. The hydraulic (or the electro-mechanical) control systems respond to the $\phi_c$ position to control $\theta_c$ and the flap deployments
- increasing wind speed will result in increased power extraction in order to maintain $\Omega(=d\phi_c/dt)$ at a constant value. The constant value will be selected at the maximum value that is compatible with the required time to execute the $\phi_c$ dependent positioning operations. $d\phi_c/dt=\Omega=1.5$ rpm was selected as a representative angular speed for the present discussion.

Electrical Generator Operation

The large diameter of the vertical axis wind turbine 10 makes it an ideal generator of electric power. FIG. 7 presents the magnets 92 that are mounted on the periphery of the frame 20; their nominal dimensions (2 cm. width) will cause the ac voltages ($e_1, e_2, e_3$) to be efficiently produced by the action of sweeping the rotor magnets 92 past the stationary (stator) coils 94. (A cluster of these magnets (NSN) creates one ac cycle). The efficient conversion of wind power to electrical power is a result of the relatively high frequency of ($e_1, e_2, e_3$). Conventional power electronics can condition the time varying periods of $e_1$, $e_2$, and $e_3$ into power that can be synchronized with the grid (60 Hz) and regulate the rotation rate to the desired value.

The vertical axis wind turbine 10 offers an ideal combination of aerodynamic effectiveness and electrical power generation. Specifically, the large diameter of the frame 20 will permit the revolving permanent magnets 92 and the slightly larger diameter current carrying stator coils 94 to represent an electrical generator that may readily be 20 meters in diameter. Its relationship to the standard generator design ensures its functionality. Specifically, the electric machine in this design is functionally equivalent to surface permanent magnet machines, in which the permanent magnets are mounted on the surface of the rotor. In the present case, the electric machine rotor is part of the wind turbine rotor. In consideration of the electric machine design, the number of magnetic poles can be determined such that the desired output electric frequency (in the order of tens Hz) is matched with the maximum operating speed of the turbine.

The basic operating principle of the electric machine equipped with permanent magnets is that the alternating currents in the stator winding will produce a rotating magnetic field, which interacts with the magnetic field created by permanent magnets to produce torque. By regulation of the stator currents, both the magnitude and the orientation of the magnetic field excited by the stator currents can be controlled. Hence, the torque of the machine can be controlled and the speed of the electric machine-turbine rotor can be regulated to track the speed command. The turbine speed command will typically come from an optimal power point tracking control block that maximizes the captured power given a measured wind speed.

The exceptionally large circumferential distance ($20\pi$ meters=62.8 meters) means that there can be an exceptionally high fundamental frequency, which is ideal for electrical efficiency since it eliminates the need for a speed increasing gearbox.

The inherent energy storage capability of the large mass of the rotating frame 20 will ensure stable operation against short-term intermittency of wind speed variations. This provides stable output power with limited requirements for further power electronics controls—a desirable condition from the point of view of power system control.

The required control of the angular speed ($\Omega$), that is essential for the maximum efficiency (electrical power output/wind power input) to be provided by the vertical axis wind turbine 10, is quite simply enabled by standard power electronics components. Technically, the function of speed control of the machine/turbine is accomplished with a power converter that is connected between the terminals of the machine's stator winding and electric power grids. The power converter can effectively and efficiently synthesize the appropriate voltage by controlling internal semiconductor switches. At a very simplified level, the electric machine can be modeled with a set of winding inductances and induced voltages (or electromotive forces) that result from the rotating permanent magnets. Thus, dynamic control of the stator currents can be realized with a set of dynamically controlled voltages synthesized by the power converter. Accordingly torque and speed control of the wind turbine is achieved.

APPENDIX

Analytical Expression for $\theta_c(\phi_c)$

The cascade 40 will be rotated about the axis of its support shaft 42 (see FIG. 2) to establish the angular position: $\theta_c$ as a function of the assembly rotation: $\phi_c$. This Appendix presents the analytical basis for $\theta_c = \theta_c(\phi_c)$.

The angles of attack of the airfoils 60 with respect to the local oncoming wind can be reliably estimated (a'priori) for the forward half of the $\phi_c$ rotations: $\phi_c=3\pi/2 \to \pi/2$. The approach flow angles in the leeward region ($\phi_c=\pi/2 \to 3\pi/2$) will be influenced by the upwind cascades. For the present analysis, the required $\theta_c$ angles will be determined as if there is no upwind effect.

The vector triangles:

$$\vec{V}_{a/A} = \vec{V}_{a/g} + \vec{V}_{g/A} \tag{A.1}$$

for each $\phi_c$ value identify the approach flow of the air (a) ($\vec{V}_{a/A}$) with respect to the airfoil (A). The negative of the velocity of the airfoil 60 with respect to the ground: $\vec{V}_{A/g} = \vec{\Omega} \times \vec{R}_c$, provides the $\vec{V}_{g/A}$ velocity. An isolated flapped airfoil gains its maximum lift at ca 8 degrees angle of attack. (This value is dependent on the cascade configuration and may change.) Hence, with representative values for $R_c(=10$ m) and $\Omega(=2\pi \text{rad}/40 \text{ sec})$, the $\theta_c(\phi_c)$ calculations can be established for a given $\vec{V}_{a/g}$ magnitude. (By definition, $\vec{V}_{a/g}$ is aligned with $\phi_c=0$). A Cartesian system is then useful as $$\vec{V}_{a/g} = \hat{i}u \tag{A.2}$$

and $$\vec{V}_{g/A}=\vec{R}_c\times\vec{\Omega}=-\hat{i}(R\Omega)\sin\phi+\hat{j}(R\Omega)\cos\phi \quad (A.3)$$

which yields $$\vec{V}_{a/A}=\hat{i}[u-R\Omega\sin\phi]+\hat{j}R\Omega\cos\phi \quad (A.4)$$

Introducing the angle β as the orientation of $\vec{V}_{a/A}$ yields $$\tan\beta = \frac{+R\Omega\cos\phi}{u-R\Omega\sin\phi} \quad (A.5)$$

The tip-to-tail orientation of the airfoil 60 for maximum lift can then be designated as (β+8°). The base of the cascade 40 can be described by the vector ($\hat{i}B_x+\hat{j}B_y$) with the understood orientation that $\vec{B}$ points to the half-plane: $\phi > \pi \to 2\pi$.

The orientation of the cascade base is obtained by subtracting π/2 from β. That is, $$\beta = \arctan\frac{R\Omega\cos\phi}{|\vec{V}_{a/g}|-R\Omega\sin\phi}$$

Given that the centerline of the airfoil 60 is perpendicular to the cascade base and given that θ=0 is the condition wherein the base is aligned with the radial arm 28 (that is, when the base is aligned with φ) the $\theta_c=\theta_c(\phi_c)$ relationship is obtained by rotating θ to the position $$\theta_c = \pi/2 - \phi_c + \beta$$

Figure 6A:
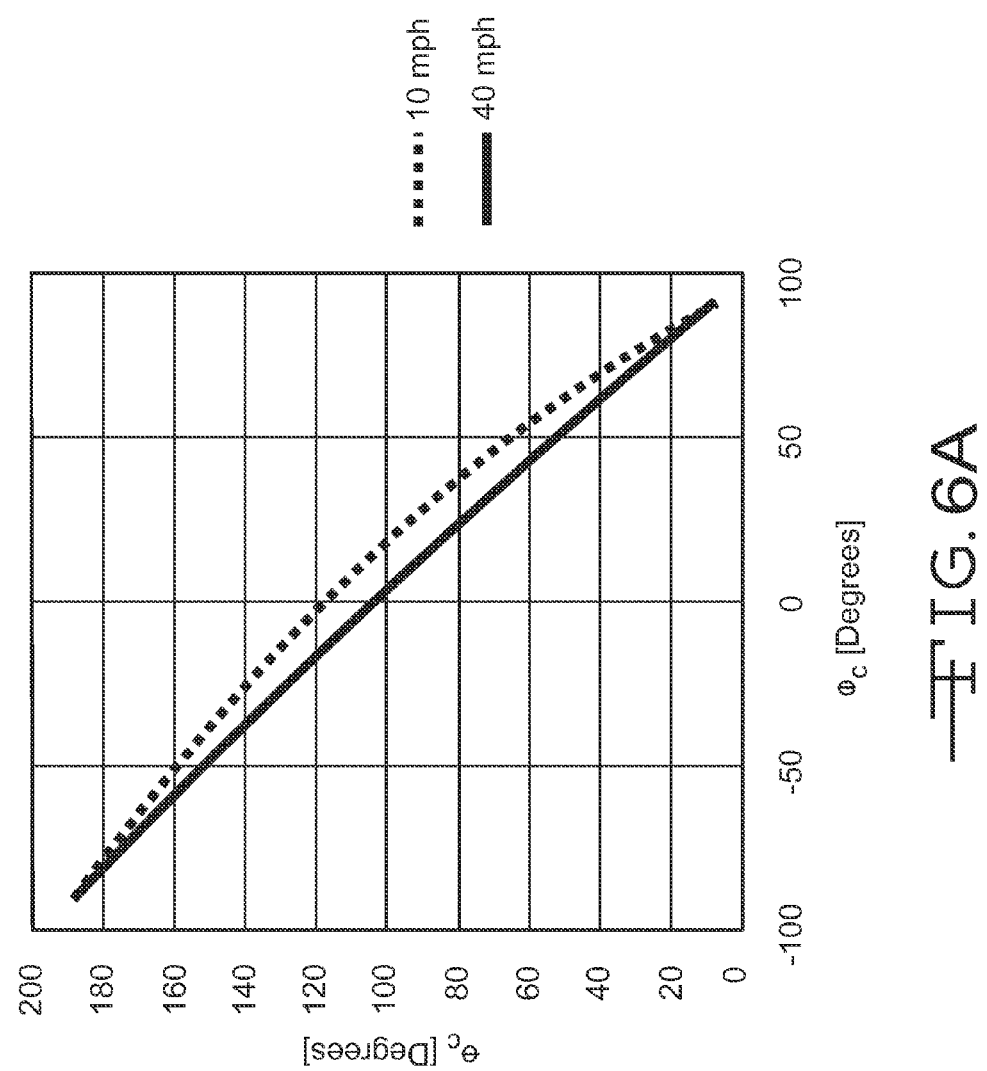
FIGS. 6A and 6B are graphs which present data relating to the operation of a vertical axis wind turbine according to the present invention keyed to the rotational position of the turbine frame.
Figure 6B:
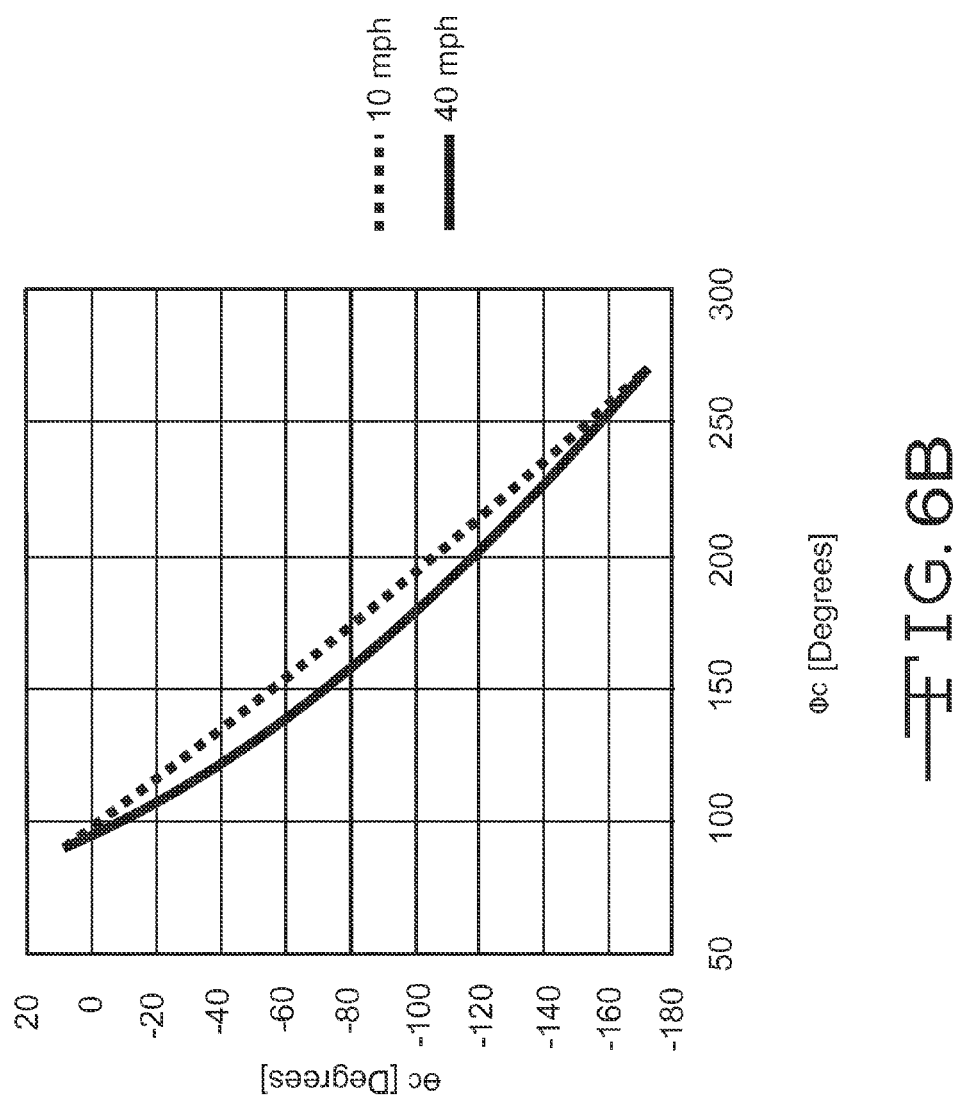

The function: $\theta_c=\theta_c(\phi_c)$ is shown in FIGS. 6A and 6B.

The description of the invention is merely exemplary in nature and variations that do not depart from the gist of the invention are intended to be within the scope of the invention. Such variations are not to be regarded as a departure from the spirit and scope of the invention.

We claim:

1. A vertical axis wind turbine, comprising, in combination,
   first, upper and second, lower vertically spaced apart circular members,
   support means for rotatably supporting said second, lower circular member, and
   a plurality of airfoil cascades disposed between said spaced apart circular members, each of said airfoil cascades including a first, upper plate and a second lower plate rotatably mounted in said respective first, upper circular member and said second, lower circular member and including a plurality of parallel, vertically extending airfoils secured between said upper and lower plates, each of said airfoils including a pivotable tail portion.

2. The vertical axis wind turbine of claim 1 further including a plurality of permanent magnets rotating with said second, lower circular member and a plurality of stationary electrical coils disposed adjacent said permanent magnets.

3. The vertical axis wind turbine of claim 1 further including cables extending between said first, upper circular member and said second, lower circular member.

4. The vertical axis wind turbine of claim 1 further including a stationary mounting structure disposed beneath said second, lower circular member and a plurality of bearings between said mounting structure and said second, lower circular member.

5. The vertical axis wind turbine of claim 1 further including a plurality of drive motors, each of said drive motors operatively coupled to a respective one of said plurality of airfoil cascades for rotating said airfoil cascades relative to said upper and lower circular members.

6. The vertical axis wind turbine of claim 1 further including a wind direction and wind speed sensing unit.

7. The vertical axis wind turbine of claim 1 wherein said airfoils include adjustable width extending members that close the space between adjacent airfoils when fully extended.

8. A vertical axis wind turbine, comprising, in combination,
   a first, upper flat member and a second, lower vertically spaced apart flat member,
   support means for rotatably supporting said second, lower flat member, and
   a plurality of airfoil cascades disposed between said spaced apart flat members, each of said airfoil cascades including a first, upper plate and a second lower plate rotatably mounted in said respective first, upper flat member and said second, lower flat member, a plurality of parallel, vertically extending airfoils secured between said upper and lower plates, each of said airfoils including a pivotable flap portion and drive means for rotating said airfoil cascade relative to said upper and lower flat members.

9. The vertical axis wind turbine of claim 8 further including a plurality of permanent magnets secured to said second, lower flat member and a plurality of stationary electrical coils disposed adjacent said permanent magnets.

10. The vertical axis wind turbine of claim 8 further including cables extending between said first, upper flat member and said second, lower flat member.

11. The vertical axis wind turbine of claim 8 further including a stationary mounting structure disposed beneath said second, lower flat member and a plurality of bearings between said mounting structure and said second, lower flat member.

12. The vertical axis wind turbine of claim 8 further including a wind direction and wind speed sensing unit.

13. The vertical axis wind turbine of claim 8 wherein said airfoils include adjustable width extending members that close the space between adjacent airfoils when fully extended.

14. A vertical axis wind turbine, comprising, in combination,
   a first, upper member and a second, lower member vertically spaced apart from said first, upper member,
   support means for rotatably supporting said second, lower member, and
   a plurality of airfoil cascades disposed between said spaced apart upper and lower members, each of said airfoil cascades including a first, upper plate and a second lower plate rotatably mounted in said respective first, upper member and said second, lower member, drive means for rotating said airfoil cascades relative to said upper and lower members, a plurality of parallel, vertically extending airfoils secured between said upper and lower plates, each of said airfoils including a pivotable tail portion and means for pivoting said tails of each of said airfoil cascades in unison.

15. The vertical axis wind turbine of claim 14 wherein said drive means for rotating said airfoil cascades includes an electric motor and one of a timing belt, chain and gear set.

16. The vertical axis wind turbine of claim 14 wherein said means for pivoting said tails includes a bi-directional actuator having an output and a linkage extending between said output and each of said pivotable tail portions.

17. The vertical axis wind turbine of claim 14 further including a plurality of permanent magnets secured for rotation with said second, lower member and a plurality of stationary electrical coils disposed adjacent said permanent magnets.

18. The vertical axis wind turbine of claim 14 further including cables extending between said first, upper member and said second, lower member.

19. The vertical axis wind turbine of claim 14 further including a stationary mounting structure disposed beneath said second, lower member and a plurality of bearings between said mounting structure and said second, lower member.

20. The vertical axis wind turbine of claim 14 further including a wind direction and wind speed sensing unit.

* * * * *